(12) United States Patent
Vrech et al.

(10) Patent No.: US 7,687,018 B2
(45) Date of Patent: Mar. 30, 2010

(54) MEANS FOR CONVEYING MATERIAL

(75) Inventors: Arbeno Vrech, Udine (IT); Alfredo Poloni, Fogliano Redipuglia (IT)

(73) Assignee: Danieli & C. Officine Meccanicite S.p.A., Buttrio (IT)

( * ) Notice: Subject to any disclaimer, the term of this patent is extended or adjusted under 35 U.S.C. 154(b) by 185 days.

(21) Appl. No.: 11/918,925

(22) PCT Filed: Apr. 21, 2006

(86) PCT No.: PCT/EP2006/061753
§ 371 (c)(1),
(2), (4) Date: Oct. 19, 2007

(87) PCT Pub. No.: WO2006/111579
PCT Pub. Date: Oct. 26, 2006

(65) Prior Publication Data
US 2009/0051084 A1  Feb. 26, 2009

(30) Foreign Application Priority Data
Apr. 22, 2005  (IT) .......................... MI2005A0732

(51) Int. Cl.
*C21C 5/52* (2006.01)

(52) U.S. Cl. ...................................... 266/172; 266/216

(58) Field of Classification Search ................. 266/216, 266/172
See application file for complete search history.

(56) References Cited

U.S. PATENT DOCUMENTS

| | | | | |
|---|---|---|---|---|
| 2,832,584 A | * | 4/1958 | Plante | 266/168 |
| 3,643,820 A | * | 2/1972 | Hammond | 198/533 |
| 5,800,591 A | | 9/1998 | Vallomy | |

FOREIGN PATENT DOCUMENTS

FR  2138490  1/1973

* cited by examiner

*Primary Examiner*—Scott Kastler
(74) *Attorney, Agent, or Firm*—Stetina Brunda Garred & Brucker

(57) ABSTRACT

Means for conveying hot granular material from a loading zone to an arc melting furnace (3), comprising a horizontal trough (1), trough vibration generators that cause the granular material to move along the trough, a sluice gate (4) to regulate the material flow in the discharge zone and a sluice gate to regulate the material flow in correspondence with the loading zone. Separating baffles (5) are arranged inside the conveyor trough defining cells in which the granular material accumulates and considerably improving the effectiveness of the action of the gases that are forced through the granular bed, for instance to prevent oxidation of the hot DRI or to perform an additional reduction process.

4 Claims, 2 Drawing Sheets

MEANS FOR CONVEYING MATERIAL

FIELD OF THE INVENTION

The present invention relates to a means for conveying material, in particular a means suitable, for example, for conveying materials of different types and in different forms, such as granular materials or materials in the form of lumps or pellets, inside a production or processing plant.

PRIOR ART

Various types of conveyor systems are known in the prior art. One important application for these systems is that of conveying hot pre-reduced iron, also known as DRI or "Direct Reduced Iron", from a direct reduction furnace, towards an electric arc melting furnace in a metallurgical plant, in particular a steelworks.

Transporting the DRI directly to the electric arc furnace is clearly advantageous but involves a number of requirements, namely:

the connection between the two furnaces must be rendered inert, as the metal will re-oxidize when exposed to atmospheric air and humidity with a significant loss of metallization;

the reduction and steelmaking plants must be separated by means of a temperature buffer to keep the DRI at a suitable temperature for being fed into the electric arc furnace.

The separation of the reduction and steelmaking plants, by means of a buffer, is necessary because the electric arc furnace operates on a batch cycle basis, whereas direct reduction plants operate continuously and it is neither possible nor advantageous to stop the flow in the reduction furnace according to the amount of DRI that is used. Therefore a portion of the DRI that is produced is usually discharged into an accumulation buffer before being carried by means of a conveyor device to the electric arc furnace; another portion of the DRI, instead, is carried to a cooling vessel in which the material is cooled to ambient temperature, or at least to temperatures at which rapid re-oxidation is prevented, before being discharged and stored ready for use later.

Conventional conveyor systems, for example belt, bucket or chain conveyors, involve high production costs and require frequent maintenance. Furthermore, they use a considerable amount of electrical power, resulting in high energy consumption.

Finally, said means result in considerable loss of temperature of the DRI with subsequent reduction in melting efficiency.

Other examples of conveyor systems in use are vibratory conveyors. Document U.S. Pat. No. 3,634,592 describes a complex electric arc furnace charging system comprising a sealed oscillating conveyor that has, however, the drawback of not allowing the material to accumulate, when the electric furnace is not being fed, and also it is not possible to regulate the supply of material to the furnace.

Another example of a vibratory conveyor system for conveying hot or cold powdery materials is described in U.S. Pat. No. 5,131,525. Also in this case the device does not allow large amounts of material to accumulate along the conveyor trough, for example, when supplying batch process systems.

The need is therefore felt to implement an innovative means of conveying material capable of overcoming the drawbacks described above.

SUMMARY OF THE INVENTION

The main purpose of this invention is to produce a conveyor means that, in particular, is capable of directly linking a direct reduction reactor or furnace with an electric arc furnace in a steelmaking plant. In this way it is possible to link two independent processes, the continuous process of the reactor and the batch process of the arc furnace.

The conveyor means according to the invention also advantageously acts as a buffer for the material being conveyed, guaranteeing a high accumulation capacity. One component can therefore be eliminated, thus reducing the overall dimensions and production costs of such systems that, given their size, can be considerable.

The present invention therefore achieves the purposes described above with a means for conveying material from a loading zone to a discharge zone that, according to that set forth in claim 1, comprises a trough, defining a longitudinal axis, and means for generating longitudinal vibrations so as to move the material along said trough, characterized in that it comprises first material flow regulating means in correspondence with the discharge zone, and second material flow regulating means in correspondence with the loading zone.

The device according to the invention advantageously comprises, inside the conveyor trough or tunnel, equalizing baffles that define accumulation cells and considerably improve the effectiveness of the gaseous fluids that are forced through the granular bed, for instance to prevent oxidation of the hot DRI or off-gases from the process to perform an additional reduction process.

Other advantages of the present invention are its extremely simple structure, the need for limited maintenance and its low energy consumption.

Another advantage is the limited loss of temperature of the DRI which results in improved melting efficiency.

The claims attached hereto describe preferred embodiments of the invention.

BRIEF DESCRIPTION OF THE DRAWINGS

Further characteristics and advantages of this invention will become apparent from the following detailed description of preferred embodiments of a means of conveying material, given by way of non-limiting example, with the help of the following figures, in which.

DETAILED DESCRIPTION OF PREFERRED EMBODIMENTS OF THE INVENTION

Figure 1:
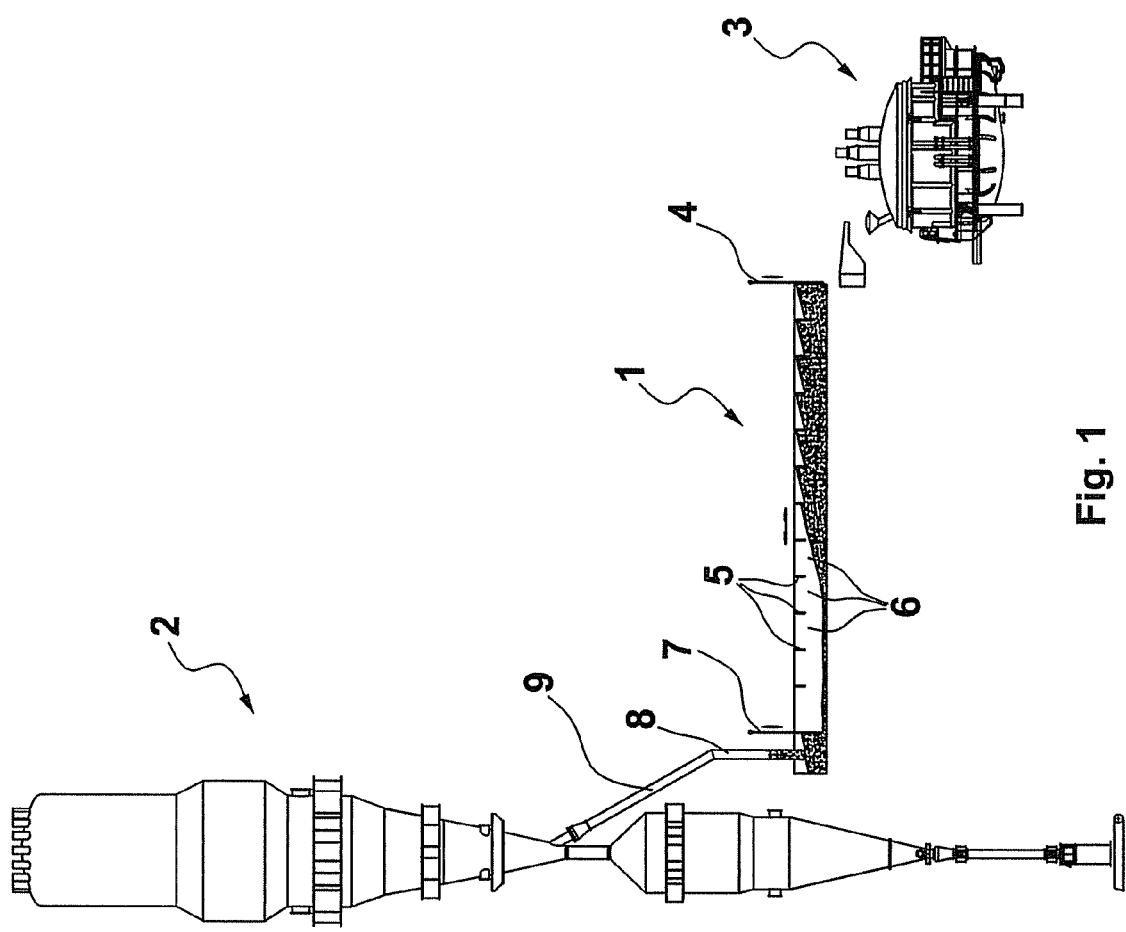
FIG. 1 is a view of a steelmaking plant comprising the conveyor means according to the invention.
Figure 2:
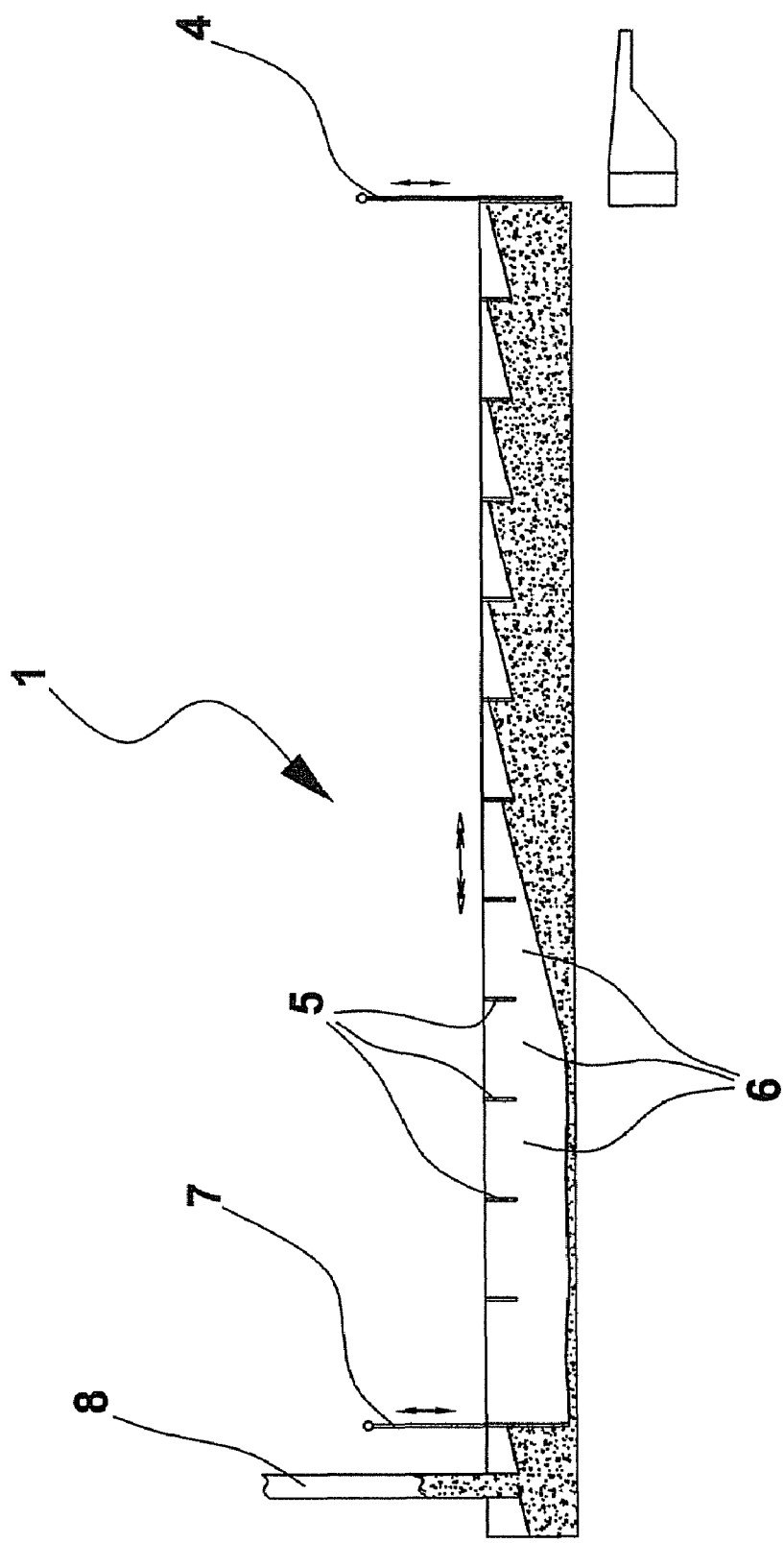
FIG. 2 is a side view of the conveyor means shown in FIG. 1.

With reference to the drawings, which are provided purely by way of example and are not limitative, a conveyor means is illustrated comprising a horizontal, or slightly slanting vibrating conveyor 1, that directly links the reactor 2 or shaft furnace with the electric arc furnace 3 and also acts as a buffer for the hot material being conveyed. The vibratory motion may be provided to the conveyor 1 by means of an eccentric-mass vibration generator, or by means of magnetic devices, or more generally, by any other system suitable for this purpose.

When the electric arc furnace 3 or EAF, which stands for "Electric Arc Furnace", is deactivated in order to tap the molten steel, the vibrating conveyor 1 continues to run but is closed at the discharge end or outlet by means of a first mobile dam or sluice gate 4, which slides vertically, in order to interrupt the flow of material into the furnace. With the discharge outlet closed, the vibratory motion causes a natural build-up of the DRI, and the formation of a pile with the front facing the outlet and having a slope angle of approximately 6-7 degrees.

Instead of the sluice gate system another device may be used to block the flow of material in the discharge section of the conveyor, such as for instance a cylindrical pipe connected to the base of the end section of the actual conveyor on which a traditional horizontal sluice gate is mounted.

A plurality of intermediate separating baffles 5 are advantageously arranged along the vibrating conveyor 1, preferably fixed vertically and arranged an appropriate distance apart, so as to leave a passage in relation to the base of the actual conveyor. Said separating baffles 5 are integral with the structure of the conveyor 1, and thus vibrate with it, and divide the conveyor into a given number of cells.

The presence of the intermediate separating baffles 5 means that when the end dam 4 is closed, completely or even just partially, the granular material naturally accumulates inside each cell 6 with the same slope angle giving rise to the characteristic saw tooth shape, visible in the longitudinal cross-section.

More specifically, with the discharge outlet closed, the build-up of material first occurs in the last cell, namely the discharge cell, and then gradually regards the other cells up to those closest to the reactor 2.

The conveying trough is advantageously emptied by appropriately controlling the discharge opening by means of the mobile dam or sluice gate 4, so as to achieve the orderly movement of the entire contents of the conveyor, including the material in the feed zone. The material thus maintains the characteristic saw tooth profile (since this formation is stable) along the entire length of the conveyor with free surfaces to eliminate the risk of bridging. It is important to note that bridging in the material on the conveyor, which would occur if there were no separating baffles, would make the buffer function impossible.

The system according to the invention thus advantageously acts as a buffer in that it ensures that the entire contents of the conveyor move towards the outlet and, thanks to the presence of free surfaces and the vibratory motion produced by suitable vibratory motion generator means, the risk of bridging or sticking of the hot material being transported is prevented.

A second sluice gate or mobile dam 7 is also advantageously positioned in the zone in which the DRI is loaded onto the conveyor, more particularly in correspondence with the first cell on the conveyor 1, namely that into which the material is gravity-fed from the reactor 2, in order to regulate the material flow from the actual reactor and make sure that the connecting pipe 8 is always full of material. The latter condition is necessary in order to utilize a dynamic gas seal 9.

The dynamic gas seal utilized in the pipe 8 is based on the principle of a pipe full of material the ends of which lead into environments at different pressures. An inert gas, usually nitrogen, is injected into an intermediate point of the pipe at an appropriate pressure (comparable to the highest pressure in the two environments). The gas thus flows along the pipe towards the environment with the lowest pressure and encounters a pressure drop due to actual permeation in the material. For this reason the pipe must be full of material which thus forms a plug against the gas flow from the higher pressure environment towards the lower pressure environment. In that case the nitrogen flows out through the dynamic seal at the discharge point in the first empty cell in the conveyor 1, downstream of the sluice gate 7. From here the gas flows along the entire conveyor passing through the gaps in the separating baffles until reaching the point at which the system discharges into the EAF 3, at atmospheric pressure.

On the basis of this principle not only is the seal leg of the reduction reactor inert, but also the entire conveyor 1, in which, in principle, no other injection points are necessary, unless greater control of the gas flow is required.

The second sluice gate 7 thus regulates the flow out of the reactor 2, while the first sluice gate 4 regulates the material flow into the melting furnace 3.

A further advantage consists of the fact that the structure of the conveyor 1, thanks to the separating baffles 5, considerably improves the efficiency of the gaseous fluids that are forced through the granular bed, such as for example gases to prevent the oxidation of the hot DRI or off-gases from the process to perform an additional reduction process.

When the gas is forced to pass in the material through the separating baffles, it also encounters a pressure drop along the conveyor. The actual conveyor thus acts as a "dynamic seal leg" and reduces the risk of air entering and rising from the discharge zone.

Furthermore the separating baffles 5 advantageously constitute physical barriers to the propagation of any air that may enter the system. In practice said separating baffles are a sort of flame trap and reduce the risk of catastrophic explosions.

According to a first advantageous embodiment the conveyor 1 consists of a trough with a closed cross-section, preferably having a quadrangular shape, with no separating baffles. This type of structure is used to obtain a greater accumulation capacity with the same conveyor dimensions. Proper functioning is guaranteed with this alternative embodiment when the vibratory motion shakes the material being conveyed so as to overcome the material's natural tendency to bridge and pack the material into the closed pipe.

According to another alternative embodiment an open-top trough is placed inside a tunnel that is preferably insulated and fitted with intermediate separating baffles, in which the atmosphere is controlled.

The conveyor means according to the invention may also be implemented in the form of a trough that is superiorly closed along more or less long sections of its length and superiorly open along other appropriate sections.

The system according to the present invention provides the following advantages:

- materials can be conveyed over long distances, for example 50-60 meters;
- the feed path is significantly lowered thanks to the use of a direct horizontal reactor-EAF conveyor;
- the vibratory conveyor system uses a fairly limited amount of electrical power, thus consuming less energy than other conveyor systems that are known;
- melting efficiency is improved as there is a reduced loss of temperature of the DRI in the conveyor, at the most 100-150° C. The DRI is thus fed hot to the EAF at an ideal temperature, of approximately 680-700° C.

The means according to the present invention can advantageously be used, in the same way and obtaining the same advantages described above, in all fields of application where:

- material must be conveyed horizontally;
- it must be possible to simultaneously force gas through the bed of material being conveyed;
- buffer functions must be created by shutting one or more sluice gates to sectionalize the flow, while at the same time ensuring a stable granular bed without bridging;
- it is necessary to prevent the risk of the material sticking thanks to the vibratory motion of the conveyor and the low pressure forces involved, which are limited due to the presence of free surfaces in each cell.

It is also interesting to note that the means according to the invention can be used in the food and chemical industries and for processing granular materials in general, for example seeds, maize, etc.

Some types of materials can be transported using a conveyor that is not superiorly covered, in which case the material can come directly into contact with the atmospheric air. In that case of course, air cannot be forced through the granular bed.

The invention claimed is:

1. Conveying means for conveying material from a loading zone to a discharge zone comprising a trough, defining a longitudinal axis, means for generating longitudinal vibrations so as to move the material along said trough, a first sluice gate at the loading zone characterized in that it comprises
a second sluice gate at the discharge zone,
a plurality of baffles arranged along and integral with said trough, placed an appropriate distance apart and arranged so as to leave a gap in relation to a base of the actual trough through which the material can pass.

2. Conveying means according to claim 1, wherein said trough has a quadrangular cross-section transversely to the longitudinal axis.

3. Conveying means according to claims 1 or 2, wherein the trough has a substantially U-shaped cross-section transversely to the longitudinal axis.

4. Metallurgical plant comprising a reduction furnace and an electric arc furnace, placed a given distance apart, wherein there is a conveyor means according to claim 1.

* * * * *